(Model.)

A. J. WOLFF & A. E. MILTIMORE.

VEHICLE WHEEL.

No. 268,341. Patented Nov. 28, 1882.

3 Sheets—Sheet 1.

WITNESSES
Jas. E. Hutchinson.
Geo. W. Seymour.

INVENTORS.
Arthur J. Wolff.
Alonzo E. Miltimore.
By Liggett & Liggett, Attorneys

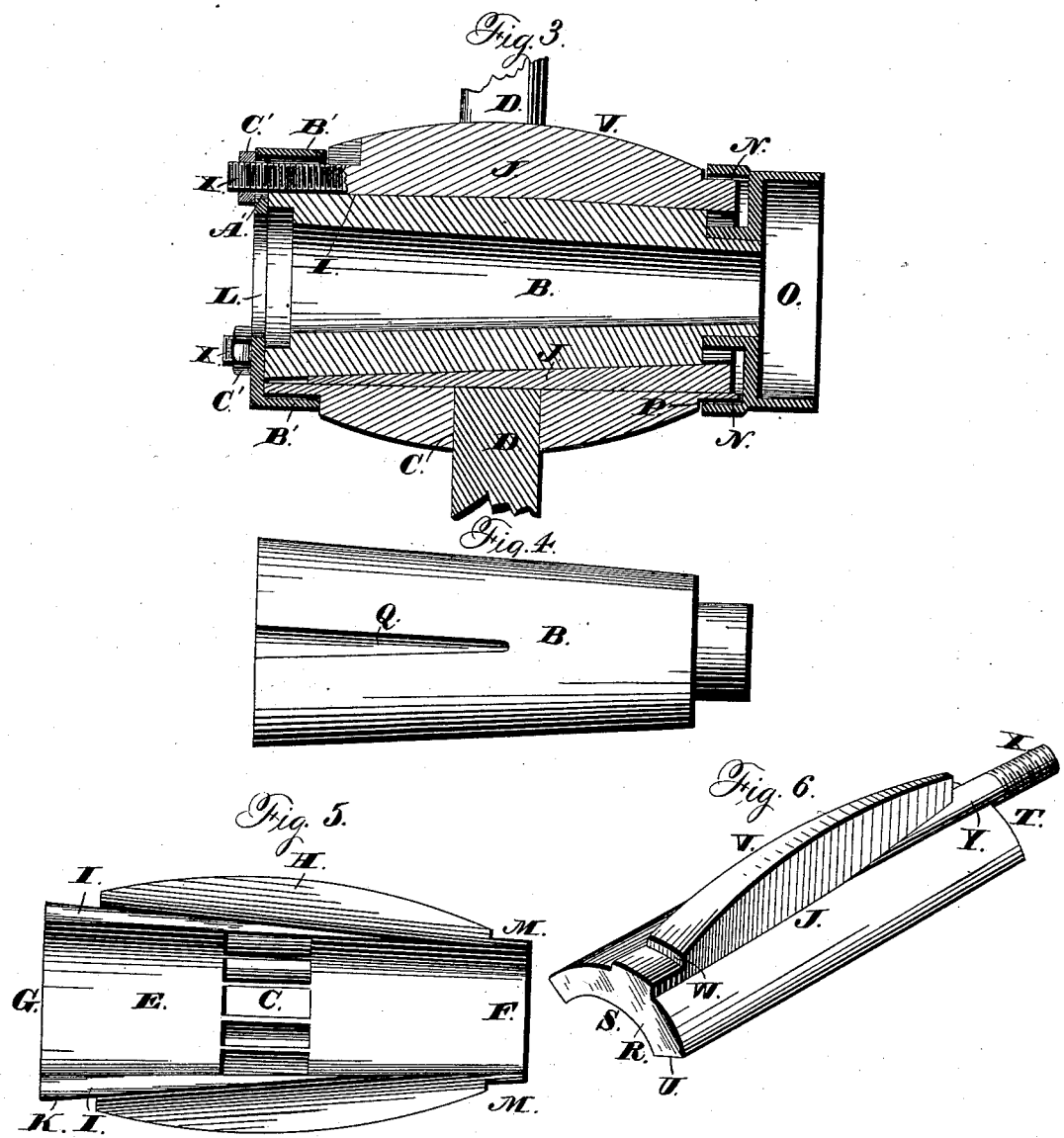

(Model.)
3 Sheets—Sheet 3.
A. J. WOLFF & A. E. MILTIMORE.
VEHICLE WHEEL.
No. 268,341.
Patented Nov. 28, 1882.
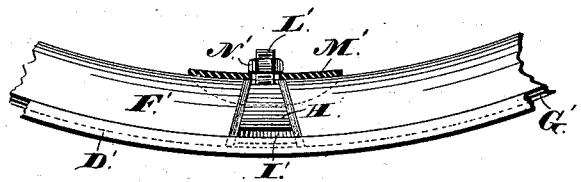
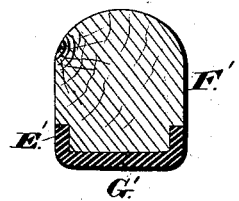
WITNESSES
INVENTORS.
Attorneys

UNITED STATES PATENT OFFICE.

ARTHUR J. WOLFF AND ALONZO E. MILTIMORE, OF BROWNSVILLE, TEXAS.

VEHICLE-WHEEL.

SPECIFICATION forming part of Letters Patent No. 268,341, dated November 28, 1882.

Application filed March 21, 1882. (Model.)

*To all whom it may concern:*

Be it known that we, ARTHUR J. WOLFF and ALONZO E. MILTIMORE, of Brownsville, in the county of Cameron and State of Texas, have invented certain new and useful Improvements in Wheels; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

Our invention relates to an improvement in wheels, and more particularly to that class of wheels having expansible naves.

The object of our invention is to produce wheels of the character described, which shall be adapted to compensate for the contraction and expansion of the felly.

A further object of our invention is to produce wheels adapted to be readily dismantled to permit any worn or defective parts to be replaced.

A further object of our invention is to produce wheels having expansible naves, which shall combine simplicity of construction and ease of management with durability in use and great strength.

With these objects in view, our invention consists in certain details of construction and combinations of parts, as will be hereinafter described, and pointed out in the claims.

Figure 1:
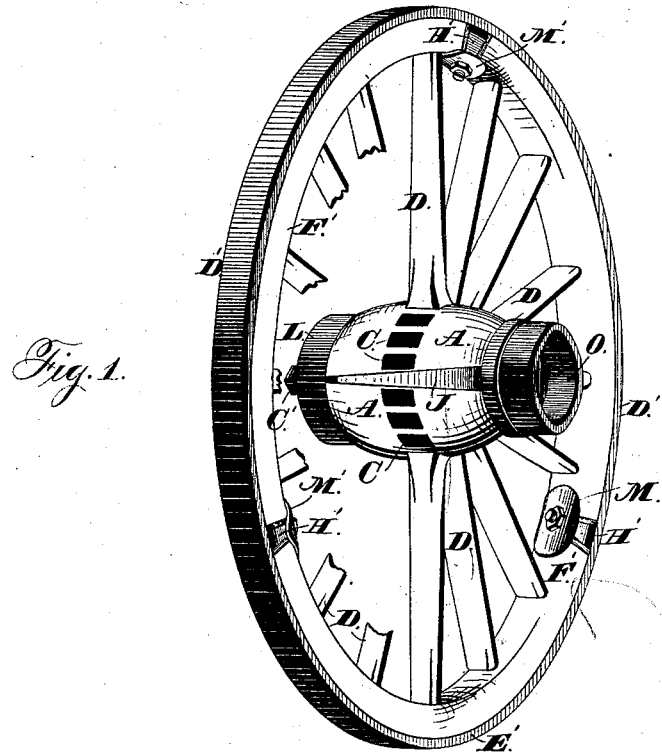
Figure 2:
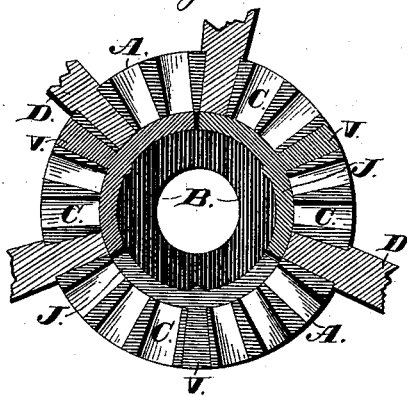

In the accompanying drawings, Figure 1 is a view in perspective of a wheel constructed in accordance with our invention. Fig. 2 is a view thereof in vertical cross-section. Fig. 3 is a view in horizontal cross-section. Fig. 4 is a view in side elevation of the tapering axle-box. Fig. 5 is a view in perspective of one of the nave-sections. Fig. 6 is a view in perspective of one of the wedges. Fig. 7 is a view in side elevation of a section of the wheel tire and felly provided with our improved device to compensate for changes in the felly. Fig. 8 is a view in vertical cross-section through the tire and compensating device, and Fig. 9 is a view in cross-section through the felly and tire.

The nave-sections, which are adapted to be expanded, as will be hereinafter described, are designated by the letter A. Each of the said sections is provided with a suitable number of sockets, C, radially disposed to the axis around which the wheel revolves, and adapted to receive the spokes D. The inner faces of the nave-sections are provided with concavities E, the width and depth whereof increase from the outer ends, F, to the inner ends, G, of the said sections, which are also provided on each edge with outwardly-inclining bevels H, which, following the general contour of the nave-sections, diverge toward their inner ends. Concave recesses I, located on the outer edges of the concavities E, extend with decreasing depth and width from the inner to the outer ends of the nave-sections. These several configurations of the inner faces of the nave-sections are designed to adapt them to conform to the wedges J. The outer faces of the inner ends of the sections A are cut away, as shown at K, to adapt them to receive the cap L, while the outer faces of the outer ends of the said sections are cut away, as at M, to permit them to be received in the annular recess N, formed in the inner face of the sand-box O, and to provide a shoulder, P, to rest upon the inner edge of the said sand-box.

The tapering axle-box B, which is perforated in the direction of its longest axis for the reception of the axle, increases diametrically toward its inner end. Concave recesses Q extend with decreasing depth and width from the inner edges of the tapering box B toward its outer end. A sand-box, O, is secured to the outer and smaller end of the tapering axle-box B. The inner face of the said sand-box is provided with an annular recess, N, to receive the outer ends, F, of the nave-sections A and the outer ends, R, of the wedges J. The said wedges are provided on their inner faces with concavities S, which extend with increasing depth and width from the outer ends, R, to the inner ends, T, of the wedges. Bevels U, formed on the opposite edges of the wedges, adapt them to fit together when they are grouped around the axle-box B. The outer faces of the wedges are provided with ribs V, which fit between the contiguous edges of the nave-sections A, the nave-sections being adapted to this adjustment by the diverging bevels H, before described. The said ribs, which taper from their outer toward their inner ends, are provided at their outer ends with shoulders W, which rest upon the inner edge of the sand-box O. The inner ends of the wedges are provided with lifting-screws X, the shanks Y of which extend toward the central portion of the wedges and project from both their inner and outer faces. These shanks are designed to give greater strength to the wedges, the inner edges of which are thin. Those portions of the shanks which project from the inner faces of the wedges will be received within the concave recesses Q, formed in the outer face of the tapering axle-box, as before described, while those portions of the shanks which project from the outer faces of the wedges, and which are, for the most part, located on opposite sides of the ribs V, are received within the recesses I, formed in the edges of two contiguous nave-sections. With regard to the description of the wedges, it may finally be observed that they taper in thickness from their outer ends, R, to their inner ends, T, and that their outer faces are convexed to fit within the concavities E of the nave-sections A. It may also be observed that both the nave-sections and the wedges are wedge-shaped in plane contour, their broader ends, considering them as wedges in plane contour, being located at the inner end of the axle-box. The outer faces of the nave-sections are preferably arranged to together form a round nave; but this finish is not necessary.

The cap L is provided with an aperture to receive the axle, with apertures A', through which the lifting-screws X are passed, and with a depending flange, B', adapted to fit over the outer ends, F, of the nave-sections A. The said cap is held in position and the nave expanded by means of nuts C'.

In putting the component parts of the expansible nave together the wedges are first grouped around the tapering axle-box, the nave-sections are then placed in the three spaces formed between the ribs V of the wedges, and finally the cap L is placed in position and held down by the nuts C'. It must be now apparent, from the described configuration and arrangement of parts, that after the nuts C' have been screwed down to impingement with the upper face of the cap, any further manipulation of them in the same direction will operate to elevate the wedges, causing them to force apart or expand the nave-sections A. In doing this the twofold wedge structure of the wedges—namely, their wedge shape, considering them longitudinally—and the ribs V will be brought into play.

Having considered the expansible nave as a unitary structure, it now remains to describe its functions in compensating for changes in the felly, caused by the contractions and expansions due to the absence or presence of moisture, and to describe in detail the construction of the felly and tire, and the devices connected with them to compensate for changes in the felly.

Referring to Fig. 7 of the drawings, D' represents the wheel-tire provided with downwardly-depending flanges E', the felly F' being provided with rabbets G' to receive the said flanges. The felly is made up of any desired number of sections, and between the contiguous ends of all of the sections a compensating device is located. This consists of a metallic wedge, H', the upper and broader end of which is cut away, as at I', to permit it to play between the depending flanges E' of the tire, the side faces of the wedge being flush with the felly-sections. The ends of the felly-sections aforesaid are appropriately cut away and faced with metal plates K' to provide suitable bearings for the wedge H', from the lower and smaller end of which a screw, L', projects. A perforated plate, M', concaved to fit the under face of the felly-section, is passed over the end of the screw, the projecting end of which is provided with a nut, N'. After the nut has been screwed down to impingement with the said plate any further manipulation of it in the same direction will operate to draw the wedge H' down and fill the spaces between it and the contiguous ends of the felly-sections, if there be such spaces, or to force the felly-sections apart, if no such spaces exist. Let it be presumed, now, for purpose of illustration, that the spokes and felly-sections of the wheel have become very dry and shrunken, and that it is desired to bring all the parts into a tense engagement. To accomplish this the nuts C' must be manipulated and the nave expanded. This will necessarily enlarge both the circle in which the inner ends of the spokes are located and that in which their outer ends are located. This will result in tightening the wheel, but also in the separation of the contiguous ends of the felly-sections. The wedge is now brought into play to close up these spaces, as described, and the wheel is thus restored to a tense and also perfect condition. If, on the other hand, the spokes and felly-sections of the wheel become greatly swollen by an excess of moisture, and there is danger that the wheel will be thrown out of shape, the nuts C' are unscrewed and the wedges driven down. This will relieve and effect a contraction of the nave, and both the circle in which the inner ends of the spokes are located and the circle in which the outer ends of the spokes are located will be reduced in size. A contraction in the felly will result, and the nuts N' must be unscrewed to relieve the wedges H' and permit the contiguous ends of the felly-sections to approach each other. In this way, assisted by simple mechanism, wheels may be kept in perfect condition with the expenditure of very little labor and time. Should any one of the spokes or any one of the felly-sections prove defective, or should any of the parts of the wheel become worn, it may be readily dismantled and the parts replaced.

While our improved wheel was primarily designed for heavy military carriages, for which use it is especially adapted, its use is in nowise limited to them or any other style of carriages, for it may be employed in all and any situations where expansible naves are desirable in wheels without regard to the uses to which they may be made subservient. Nor is the invention limited to the exact construction shown, for a double wedge may be employed in lieu of a single one, if such a change is desirable.

In view of the numerous applications to which we design to make our improved wheel subservient, and also in view of the oscillation of the ordinary practical conditions, we would have it understood that we do not limit ourselves to the exact construction shown and described, but that we hold ourselves at liberty to make such changes and alterations as fairly fall within the spirit and scope of our invention.

Having fully described our invention, what we claim as new, and desire to secure by Letters Patent, is—

1. An expansible nave for wheels, consisting of a nave made up of sections arranged to be forced apart or brought together to enlarge or contract the circles in which the inner and outer ends of the wheel-spokes are located.

2. An expansible nave for wheels, consisting of a nave made of sections which are arranged to be forced apart by the manipulation of wedges interposed between the nave-sections and the axle-box.

3. An expansible nave for wheels, consisting of a nave made of sections which are arranged to be forced apart by the manipulation of wedges interposed between the contiguous edges of the nave-sections and axle-box.

4. The combination, with an axle-box, of wedges grouped around it, and nave-sections grouped around the wedges and arranged to be forced apart by the manipulation of the same.

5. The combination, with an axle-box, of wedges grouped around it, nave-sections grouped around the wedges and arranged to be forced apart by the manipulation of the same, and devices located at each end of the axle-box to hold the nave-sections and wedges in proper place.

6. The combination, with an axle-box, of a sand-box, wedges grouped around the axle-box, and nave-sections grouped around the wedges, the outer ends of the wedges and nave-sections being inserted in the sand-box.

7. The combination, with an axle-box, of wedges grouped around the axle-box, nave-sections grouped around the wedges, lifting-screws projecting from the inner ends of the wedges, a perforated cap to fit over said screws, and nuts to screw onto the projecting ends of the screws.

8. The combination, with an axle-box, of wedges grouped around it, said wedges being provided with wedge-shaped ribs on their outer faces, and nave-sections grouped around and located between the ribs of contiguous wedges.

9. The combination, with an axle-box, of wedges grouped around it, nave-sections grouped around the wedges, a sand-box having an annular recess in its inner face to receive the outer ends of the wedges and nave-sections, a perforated cap to fit over the inner end of the axle-box, and the inner ends of the wedges and nave-sections and lifting-devices secured to the wedges and projecting through the said cap.

10. The combination, with a tire having depending flanges on each edge, of a sectional felly, wedges located between the contiguous ends of the felly-sections, the upper and broader ends of the said wedges being cut away to adapt them to be received between and to be guided by the flanges of the tire, and devices to operate the said wedges, substantially as set forth.

In testimony that we claim the foregoing we have hereunto set our hands and seals this 17th day of March, 1882.

ARTHUR J. WOLFF. [L. S.]
A. E. MILTIMORE. [L. L.]

Witnesses:
HUGH SIEBERG,
WILLIAM EWALD.